Nov. 2, 1937.  J. G. DEVENNEY  2,098,179
COMBINED PASTEURIZER, CHURN, AND BUTTER WORKER
Filed Dec. 12, 1934  3 Sheets-Sheet 1

Inventor
Joseph G. Devenney
By his Attorneys
Williamson & Williamson

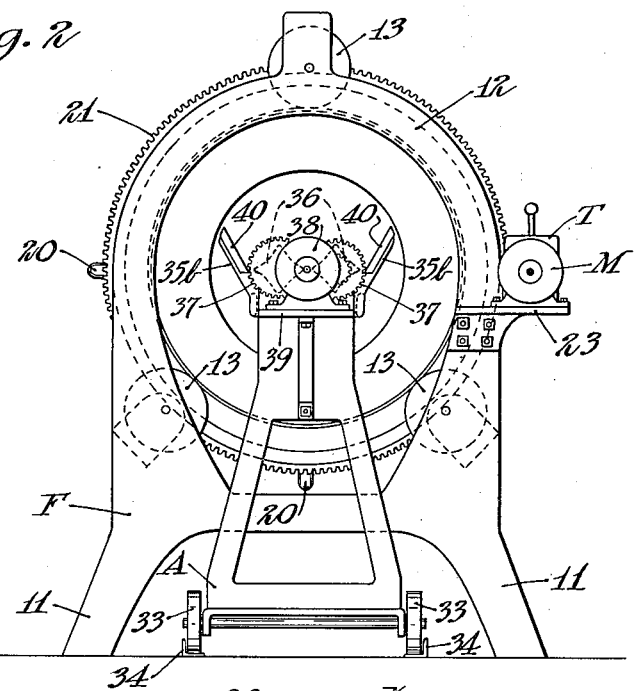
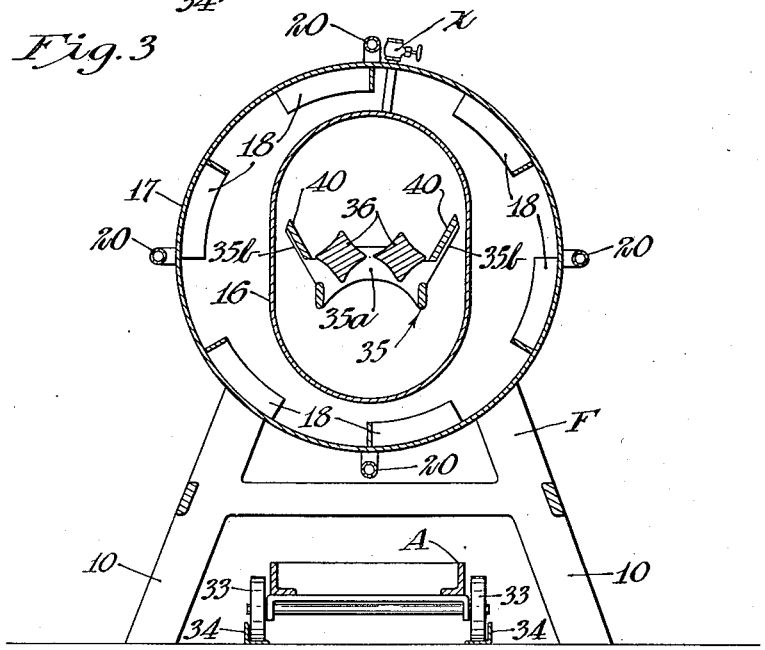

Nov. 2, 1937. J. G. DEVENNEY 2,098,179
COMBINED PASTEURIZER, CHURN, AND BUTTER WORKER
Filed Dec. 12, 1934 3 Sheets-Sheet 3
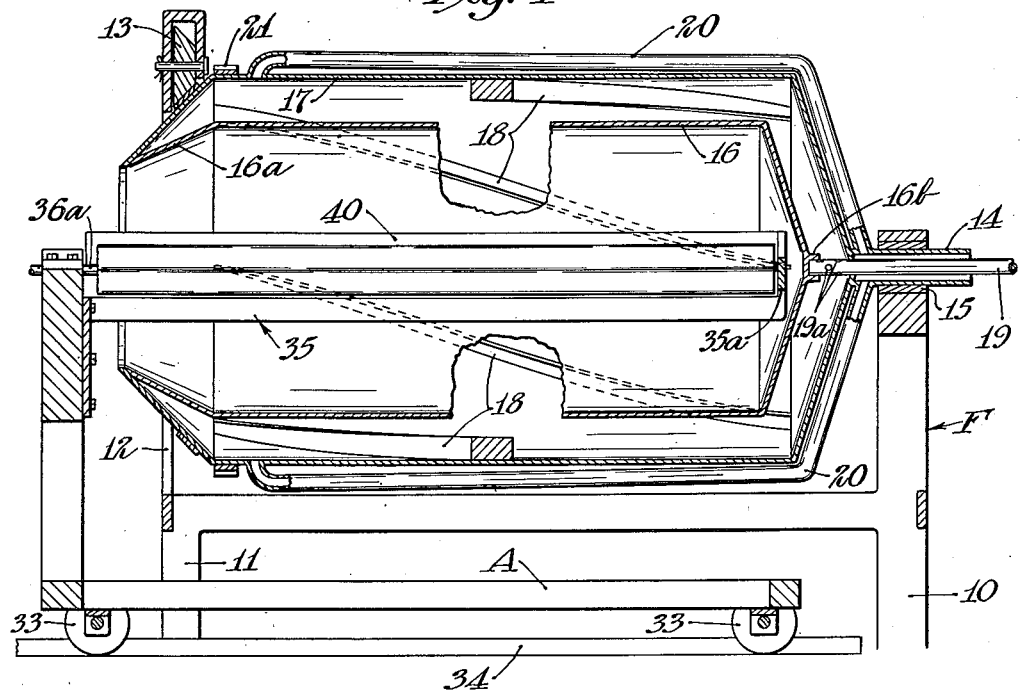
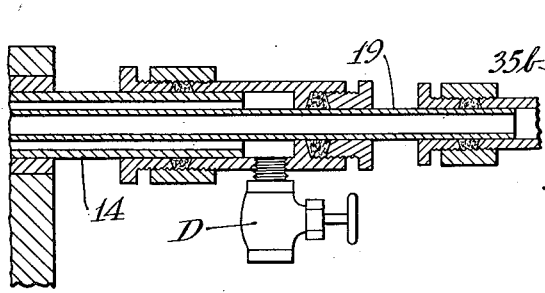
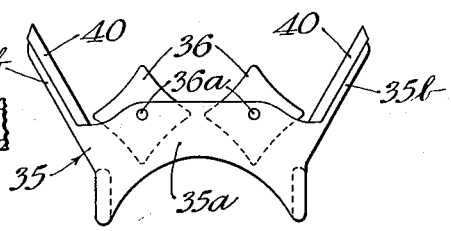
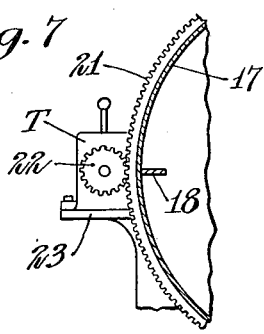
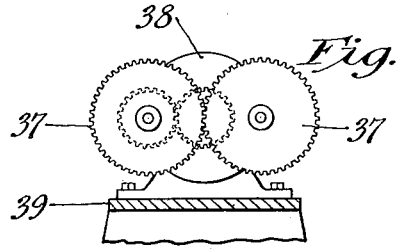
Inventor
Joseph G. Devenney
By his Attorneys
Williamson & Williamson Patented Nov. 2, 1937

2,098,179

UNITED STATES PATENT OFFICE 2,098,179

COMBINED PASTEURIZER, CHURN, AND BUTTER-WORKER

Joseph G. Devenney, Minneapolis, Minn.

Application December 12, 1934, Serial No. 757,117

3 Claims. (Cl. 31—33)

This invention relates to apparatus for making butter and more particularly to a combined pasteurizer, churn and butter worker.

Heretofore combined churns and butter workers have been common, but independent apparatus for pasteurization has been usually required. Efficient pasteurization of the cream is highly essential and pasteurizing apparatus which will cause the cream to quickly pass the temperature of 100 degrees Fahrenheit has been found desirable. It is well known that the temperature of 100 degrees F. is a critical temperature in that bacteria develops very rapidly at this point.

It is an object of my invention to provide a compact and highly efficient machine which will successfully pasteurize the cream, raising the temperature of the contents of the container or churn very rapidly to avoid production of bacteria at the critical temperature mentioned and which is equally adapted to quickly chill the contents to the proper temperature for churning and which machine is adapted to provide an improved and efficient churning action to convert the cream to butter and includes butter workers of efficient type which have a close cooperating action with the rotary movement of the churn to efficiently work and condition the butter.

More specifically it is an object to provide a machine of the class described wherein the interior of the churn is of irregular cross sectional shape producing an efficient churning action and wherein the exterior of the churn container is provided with a jacket through which a cooling or heating medium may be circulated to pasteurize or cool the butter.

It is a further object to provide such a churn and pasteurizer which will readily receive and cooperate with butter working mechanism suitably mounted on a truck and insertable from one end of said churn.

These and other objects and advantages will be more apparent from the following description made in connection with the accompanying drawings wherein like reference characters refer to similar parts throughout the several views, and in which:—

Fig. 2 is a front elevation of the same;

Fig. 3 is a cross section taken on the line 3—3 of Fig. 1;

Fig. 4 is a vertical section taken longitudinally through the machine with the butter working mechanism applied;

Fig. 5 is a detail view showing the butter working elements and their frame detached;

Fig. 6 is a detail view showing the mechanism for driving the butter working elements in opposite directions;

Fig. 7 is a detail view showing the means for driving the rotary churn and the variable speed transmission mechanism associated therewith, and Fig. 8 is a detail sectional view showing the conduits and system for connecting the pasteurizing casing or jacket with sources of heating and cooling mediums.

Figure 1:
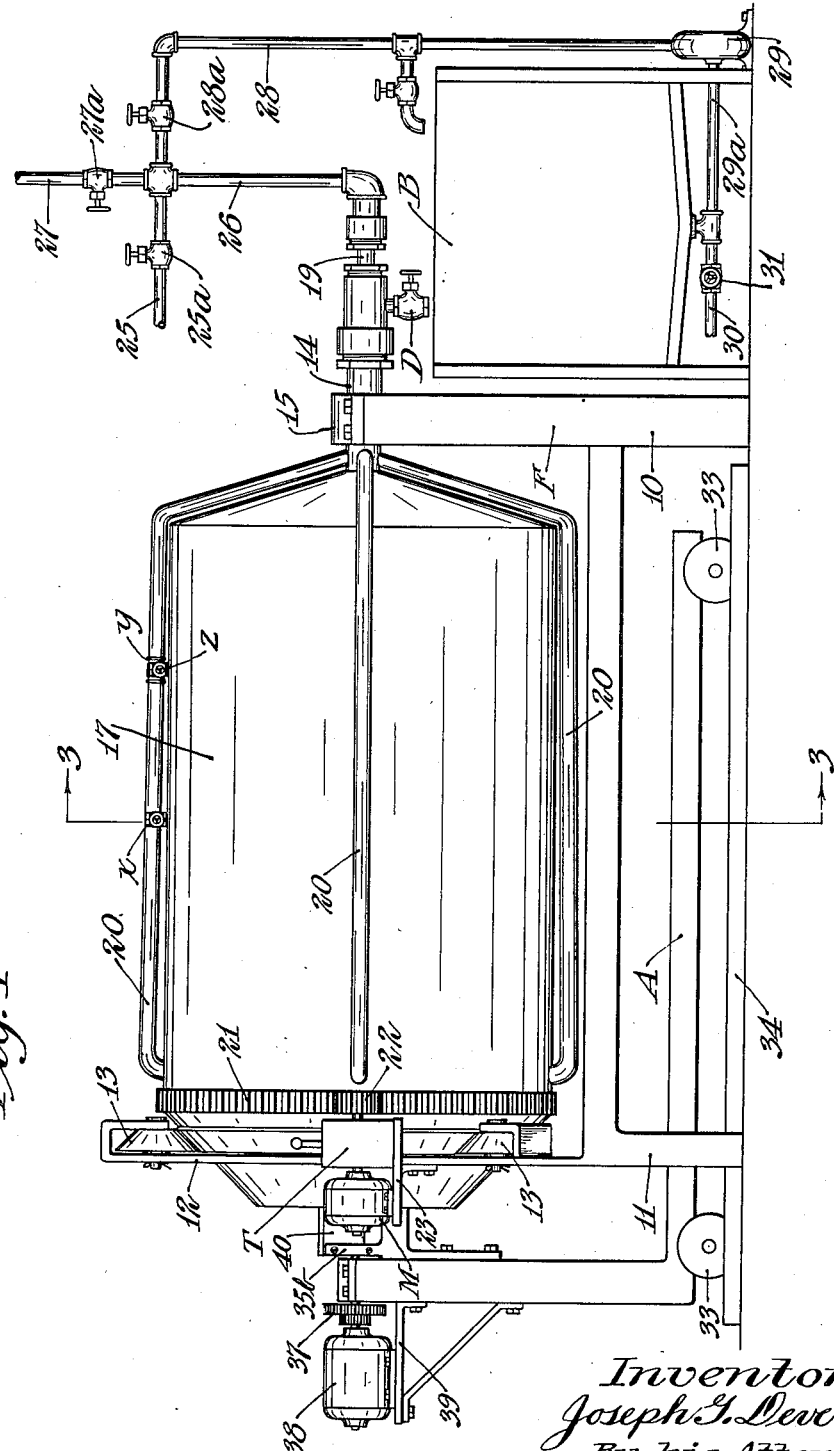
Fig. 1 is a side elevation of my improved apparatus with the butter worker mechanism operatively applied to the churn.

In the embodiment of my invention illustrated, the churn is supported on a suitable upright frame F having rear legs 10 and front legs 11, which space the churn some distance above the floor to provide for accommodation of the butter working truck. The exterior of the churn is of substantially cylindrical construction having a truncated conical forward end and as shown a conical rear end. Frame F at its forward end includes a large annular upstanding portion 12 which, as shown, is provided with mountings to which suitable truncated conical rollers 13 (three in number) are revolubly mounted, which rollers support and engage and center the truncated conical forward end of the churn. At the rear of the churn a relatively large sleeve or conduit 14 is suitably secured to the exterior casing and extends axially of the churn operating as a journal and being mounted in a bearing 15 which is provided by the rear upstanding portion of frame F. The sleeve or conduit 14 is provided with a discharge valve D which, as shown, is directed above a tank B.

The combined churn and pasteurizer is made up of inner and outer casings or shells 16 and 17, respectively. Casing 17 defines the exterior of the churn referred to and is closed at its rear end. The inner casing 16, which forms the container of the churn as shown is of elliptical cross section, spaced some distance from the peripheral wall of casing 17 and with its rear end also spaced some distance from the rear of casing 17. While I have found that a container casing 16 of elliptical cross section is preferable, I have also obtained good results with containers of various irregular and non-cylindrical cross sectional shape, such as for example, clover-leaf shape, oblong shape and figure-eight shape. The forward end of container casing 16 is diminished as shown at 16a and its forward edge is welded or otherwise rigidly secured to the forward and open end of casing 17 to form an air-tight joint therewith. The space between casings 16 and 17 forms a pasteurizing chamber or jacket to be later described in detail. If desired, a series of spaced spirally arranged blades 18 may be secured to the inner peripheral wall of casing 17 extending more or less longitudinally thereof for the purpose of efficiently distributing fluids introduced into the pasteurization chamber.

Cooling and heating fluids are introduced at the rear of the pasteurization chamber by means of a pipe 19 axially mounted in the churn and of smaller diameter than the sleeve or pipe 14. The inner end of pipe 19 may be rigidly secured within a seat afforded by a recessed boss 16b projecting from the axial rear end of the container casing 16. Conduit 19, as shown, is provided within the rear portion of the pasteurization chamber with a series of discharge ports 19a directed radially. A series of fluid discharge pipes 20 are mounted on the exterior of casing 17 circumferentially arranged thereof and extending longitudinally of the casing. These pipes 20 communicate at their forward ends with the forward portion of the pasteurization chamber and are bent inwardly at their rear ends communicating with the interior of the discharge journal sleeve or pipe 14, which it is recalled is disposed axially of the churn.

The churn as shown, is provided adjacent its forward end on the exterior of casing 17 with a large gear ring or rack 21 which is driven by a suitable pinion 22 affixed to a short driving shaft of a two-speed transmission mechanism indicated as an entirety by the letter T, which in turn is driven by an electric motor M. Motor M and transmission mechanism T may be supported from a suitable bracket or shelf 23 attached to one side of the forward portion of the frame F.

Various means for supplying both heating and cooling mediums to the pasteurization chamber may be provided. As illustrated a source of steam is connected by a conduit 25 to a common supply pipe 26 and the conduit is provided with a control valve 25a. Pipe 26 is connected by suitable fittings with the inlet conduit 19 which is rotatively mounted in a suitable packed bearing (see Fig. 8). As shown, a source of cool water, under pressure, is supplied by conduit 27 and is connected with the conduit 26. Conduit 27 is provided with a water valve 27a. A brine pipe 28 also is connected with conduit 26, the flow of brine being controlled by a valve 28a and being forced to circulate by suitable means such as a rotary pump 29 which draws its source of supply from a brine tank B. The intake 29a of the brine pump is also connected with a pipe 30 and a suitable control valve 31 is provided outwardly of the point of communication of the intake pipe 29a with the brine tank in order that if desired suction may be produced in pipe 30 for a use which will be described later in this specification.

A drainage fitting and conduit x communicates with the interior of container casing 16 and has a suitable valve mounted therein, as shown in Figs. 1 and 3 to enable the buttermilk and other liquid contents of the churn to be removed. The communication of the conduit x with the container casing is preferably screened to prevent discharge of butter granules.

A drainage fitting y is connected with one of the discharge conduits 20 at a suitable point thereon and is supplied with a valve z. Fitting y has a thread or other connection means for connection with a hose coupling or conduit connected with a source of suction, such as conduit 30 connected with the intake of pump 29.

I provide efficient butter-working mechanism insertable into container casing 16 and closely cooperating therewith. As shown, this mechanism is mounted on a truck having an L-shaped frame A, the base of which is supported a short distance above the floor by means of suitable wheels 33 which preferably run on tracks 34 affixed to the floor beneath the machine frame F. The end or upstanding portion of the truck frame A, as clearly shown in Figs. 1 and 4, has affixed to the upper portion thereof and extending horizontally in parallel relation with the base of the frame, a rigid, open, butter-working frame 35 of approximately the length of container casing 16 and having opposed ends 35a, wherein the journals of a pair of elongated butter-working elements 36 are revolubly mounted. The journals or shafts 36a at the forward ends of elements 36 are extended and have affixed thereto gears 37, which are in mesh to cause driving of elements 36 in opposite directions. One of the shafts 36a is driven by an electric motor 38 which may be conveniently mounted upon a supporting bracket 39, affixed to the forward or outer side of the upstanding portion of truck frame A. The frame 35 for the butter-working elements includes longitudinally extending and oppositely inclined side wings 35b, to which are affixed on the inner sides thereof wooden or fiber guides 40, which extend the full length of the butter-working frame, and which, of course, serve to deflect and guide butter granules and plastic butter into the working elements 36. Butter-working elements 36, as shown, are of substantially rectangular cross-sectional shape, having their side surfaces slightly concave.

*Operation*

The first step in the making of butter is, of course, the pasteurization of the cream. With my improved machine, the butter-working elements are removed from within container casing 16, which is readily accomplished by rolling the truck rearwardly an adequate distance to facilitate access to the open forward end of the churn. A quantity of cream is then poured into the container casing 16, care being, of course, taken that the level of the contents will not exceed the height of the lower portion or lip of the open end of the casing. The entire drum is then driven at relatively low speed, the speed being controlled by the conventional two-speed drive or transmission. Steam valve 25a is then opened, as well as the discharge valve D which controls discharge of fluid from the interior of sleeve 14. Steam very rapidly circulates through the pasteurizing jacket formed between casings 16 and 17, entering through the ports 19a at the rear of container casing 16, and leaving the pasteurizing jacket adjacent the forward end thereof through the forward connections with discharge conduits 20, and in its circulation, transmissively and by radiation of heat from container casing 16 very quickly raising the temperature of the cream or contents of the churn, passing the critical temperature of approximately 100° F. with such rapidity that there is little chance for bacteria to multiply. Desirable working temperatures for pasteurization range from 130° F. to 185° F. and the cream is held at the temperature utilized for an adequate period of time to thoroughly pasteurize the same, the revolution of the drum and circulation of the heating fluid and the turbulation and movement of the cream within the elliptical container casing very efficiently applying the heat to the contents of the churn.

After pasteurization, steam valve 25a is closed and cool water is first run into the pasteurizing jacket by opening the valve 27a. After circulation of the cool water in the jacket, the valve 27a is closed and the cool water removed through discharge valve D. If desired, the jacket and its conduits 20 may be completely drained by attaching the suction hose of conduit 30 to the fluid draining fitting y with, of course, the drainage valve z open. The drainage valve z is then closed, and cold brine taken from the tank B is then injected into the jacket by operating pump 29 with the brine valve 28a open. It is desirable to chill the cream rapidly after pasteurization, as it produces a better texture and composition of butter. This is effectively accomplished with my apparatus and the temperature of the brine in tank B may be properly maintained by refrigeration coils, temperature controlled to maintain the fluid in the pasteurizing jacket at a proper operating temperature for churning (usually between 38° and 60° F.).

In churning the cream, the drum is usually rotated at its higher speed and the cream is continually turbulated and churned by the revolution of the irregular or elliptical shape container casing. The revolution of this casing due to centrifugal force, causes the cream to have a tendency to swirl and move outwardly, but the cream is carried upwardly in the end portions of the elliptical cross-section and drops for the most part from the central and upper portions of the casing. A continuous circulation or churning of the cream in the manner set forth has been found very effective for converting the cream into butter.

After the butter granules have formed to the requisite size, the driving of the drum is stopped and the buttermilk is withdrawn from the container casing through the butermilk drainage valve x, when, of course, the drum is positioned with the valve x disposed at the bottom thereof. Water (and if desired salt) is then inserted in container casing 16 to substantially the level previously occupied by the buttermilk and the drum is again revolved, this time at low speed to wash the granules. After about from one to three minutes the revolution of the drum is stopped and the water withdrawn from the drain X.

The butter-working mechanism is then applied to the container casing 16 by pushing truck A forwardly and the drum is then rotated at slow speed and the motor for driving the butter-working elements is also operated. The action of the container casing 16 driven at slow speed lifts the granules or solid matter upwardly and drops the same upon the butter-working elements and the inclined and opposed guides 40 of the butter-working frame. The working of the butter is continued for the requisite time and the butter is collected on the butter workers and guides 40 by stopping motor 38 and continuing the driving of the drum for a few moments thereafter.

From the foregoing description it will be seen that I have provided a comparatively simple and highly efficient machine for pasteurizing, churning and working butter, which will assure maintenance of proper operating temperatures for the several steps in the making of butter and which will assure efficient pasteurization with very rapid heating of the cream to obviate as far as possible bacteria development at the critical temperature.

It will further be seen that the irregular, non-cylindrical cross-sectional shape of my churn or container casing not only provides an efficient churning action to convert the cream to butter, but moreover because of its constant carrying and dropping of liquids and solids, cooperates with the butter-working elements very effectively, as well as assures a thorough and efficient washing action of the butter granules.

While I illustrate a container casing of elliptical cross-sectional shape, I have found that other irregular or non-cylindrical shapes, such as a clover-leaf shape, a figure-eight shape or an oblong cross-section shape are all effective to produce the churning, elevating and dropping action herein described.

It will, of course, be understood that various changes may be made in the form, details, proportions and arrangement of the parts, without departing from the scope of my invention, which, generally stated, consists in a device capable of carrying out the objects above set forth, and in the novel parts and combinations of parts disclosed and defined in the appended claims.

What is claimed is:—

1. In a combined churn and butter worker, a container casing of substantially oval cross sectional shape mounted for revolution on a horizontal axis and having a closed rear end and an open forward end, said forward end having a truncated conical restricting flange to prevent discharge or spilling of liquid when said casing is revolved, said container casing being free from restrictions upon its interior, a jacket for containing a temperature conditioning fluid, said jacket substantially surrounding said casing, means for driving said container casing at a relatively low speed and a relatively high speed, removable butter working mechanism insertable into said casing axially thereof and including a pair of cooperating butter working elements adapted to receive solid material dropped downwardly from the upper portion of said casing and means for driving said butter working elements, said means being disposed outwardly of said casing and butter working elements.

2. In a combined pasteurizer and butter churn, a drum mounted for revolution on a horizontal axis and comprising an inner container casing of substantially oval cross sectional shape, said inner casing having a smooth interior entirely free from working mechanism and restrictions, an outer casing spaced from said inner container casing and surrounding the greater portion of the peripheral wall thereof to form a jacket for containing a temperature conditioning fluid, connections between the interior of said jacket and a source of temperature conditioning fluid whereby a circulation of such fluid may be effected during revolution of said drum, and means for revolving said drum at a speed which in view of the oval cross sectional shape of said container casing will produce a wave roll churning action upon the contents of said container casing.

3. In a combined pasteurizer, cooler and butter churn, a drum mounted for revolution on a horizontal axis and comprising an inner container casing of substantially oval cross sectional shape having a closed rear end and an open forward end through which butter working mechanism may be inserted, said forward end having a restricting flange to prevent discharge or spilling of liquid when said casing is revolving, said container casing having a smooth interior free from restrictions and working mechanism, an outer casing spaced from said inner container casing and surrounding the greater portion of the peripheral wall of said inner casing to form a jacket for containing a temperature conditioning fluid, connections between the interior of said jacket and a source of temperature conditioning fluid whereby a circulation of such fluid may be effected during revolution of said drum and means for revolving said drum at relatively low speed for pasteurizing and at higher speed for churning whereby a wave roll churning action is produced upon the contents of said inner container casing when churning is desired.

JOSEPH G. DEVENNEY.